United States Patent [19]

Barding

[11] 4,066,307

[45] Jan. 3, 1978

[54] ANTI-THEFT HOUSING FOR VEHICULAR COMMUNICATION EQUIPMENT

[76] Inventor: Paul E. Barding, 249 Wilson Place, Crown Point, Ind. 46307

[21] Appl. No.: 759,885

[22] Filed: Jan. 17, 1977

[51] Int. Cl.² .............................................. E05B 13/02
[52] U.S. Cl. ................................... 312/242; 312/215; 312/222; 312/330 SM; 312/293; 70/423; 108/45
[58] Field of Search ............ 312/242, 215, 222, 7 TV, 312/320, 330, 293, 213; 73/304; 70/232, 423; 108/45; 248/203

[56] References Cited

U.S. PATENT DOCUMENTS

| 2,719,066 | 9/1955 | Budzinski | 108/45 |
|---|---|---|---|
| 2,861,463 | 11/1958 | Gilman | 70/232 |
| 3,190,241 | 6/1965 | Rodgers et al. | 108/45 |
| 3,495,214 | 2/1970 | Wishart | 73/304 R |
| 3,606,112 | 9/1971 | Cheshier | 108/45 |
| 3,666,338 | 5/1972 | Russell | 312/215 |
| 3,899,982 | 8/1975 | Fetzek | 312/242 |
| 3,903,721 | 9/1975 | Aaron | 70/423 |

FOREIGN PATENT DOCUMENTS

| 118,409 | 6/1926 | Switzerland | 70/423 |

*Primary Examiner*—Paul R. Gilliam
*Assistant Examiner*—Victor N. Sakran
*Attorney, Agent, or Firm*—Robert D. Farkas

[57] ABSTRACT

An anti-theft housing for vehicular communication equipment utilizes a housing adapted to contain the body of the communication equipment having the face plate or front panel thereof extending outwardly from the housing by passing through an access port therein. An escutcheon plate disposed about the access port captures the front plate of the communication equipment preventing the removal of the equipment from the housing when the escutcheon plate is locked to the housing utilizing a pair of arms attached to the escutcheon plate that are located within the housing and secured thereto, by a pair of rods engaging holes in the arms and operably controlled by a key operated lock secured to the housing. The keyway of the lock is shielded by a plate secured to the housing and spaced outwardly therefrom so as to prevent tampering with the lock by unauthorized personnel. A key, having a bar extending at right angles to the length of the key, operates the lock when inserted in the space separating the plate and the adjacent exterior wall of the housing to which the lock is affixed.

4 Claims, 4 Drawing Figures

ANTI-THEFT HOUSING FOR VEHICULAR COMMUNICATION EQUIPMENT

BACKGROUND OF THE INVENTION

1. The Field of the Invention

This invention relates to anti-theft locking devices for vehicular communication and more particularly to that class of apparatus utilized to secure the communication equipment to a motor vehicle.

2. Description of the Prior Art

The prior art abounds with locking devices. U.S. Pat. No. 3,370,466 issued on Feb. 27, 1968 to T. H. Francis teaches a locking device for securing two-way radios in motor vehicles having a channel member for receiving the radio mounting screw, a lock with an advancing pin which prevents tampering with the mounting screw of the radio, the key of the lock permitting only the user to remove the radio or other device from the vehicle.

U.S. Pat. No. 3,595,041 issued on July 27, 1971 to J. E. Leeper discloses a locking arrangement having particular adaptability for use in preventing the theft of communication equipment from a vehicle characterized by hollow side members having keyway portions for selectively receiving and covering the bolts normally used to secure the communication equipment to a mounting bracket, and arms on each hollow side member pivotal to a locking position and maintained in such position by a conventional lock. In an alternative invention embodiment, a chain and lock, in tension, maintain the aforesaid hollow side members in an antitheft position.

Both of the aforementioned patents suffer the common deficiency of permitting unauthorized personnel to easily gain access to the keyway of the locks utilized to secure the communication equipment to the motor vehicle.

SUMMARY OF THE INVENTION

A primary object of the invention is to provide a locking arrangement for vehicular communication equipment in which access to lock keyway is severely restricted.

Another object of the present invention is to provide a communication equipment housing which substantially entirely encloses the equipment, thereby preventing unauthorized tampering with the internal mechanism thereof.

Still another object of the present invention is to provide a communication mounting and anti-theft apparatus which has a neat and finished appearance and which conceals from view the operative locking mechanism and vehicular mounting portions thereof.

Yet another object of the present invention is to provide a communication mounting and anti-theft apparatus in accordance with the preceding objects, which is simple in construction, relatively inexpensive and effective for its particular purposes.

With the advent of the recent popularity in electronic devices installed in motor vehicles, an everincreasing market exists for the sale of stolen devices removed from the vehicle. Tape players, citizens band radios, ham radios and other entertainment and communicating devices are frequently attached to the body of a vehicle by the owners thereof utilizing surface mounting brackets which do not adequately prevent the unauthorized removal of the electronic device from within the vehicle. The present invention substantially entirely captures an electronic device within a housing whilst permitting the operative controls of the device to be accessed in conventional fashion. A lock, whose keyway is concealed and readily inaccessible, is utilized to release or secure the electronic device within the housing. The housing may be secured to an interior portion of the vehicle such that when the housing contains the electronic device, the hardware utilized to fasten the housing to the vehicle is inaccessible to unauthorized personnel, thereby preventing unauthorized removal of the electronic device and the housing surrounding it as a unit.

These objects as well as other objects of the present invention, will become more readily apparent after reading the following description of the accompanying drawings.

DESCRIPTION OF THE PREFERRED EMBODIMENT

The structure and method of fabrication of the present invention is applicable to a rectangular housing having one wall thereof provided with an access port. An escutcheon plate covers the access port in the wall and is provided with an opening through which access may be gained to the front panel of a unit of communication equipment when the front panel of the equipment resides bounded by and in touching engagement with the escutcheon plate. A pair of arms are affixed to the escutcheon plate and extend parallel to each other rearwardly along the depth of the communication device. Each arm is provided with a hole located adjacent the free end thereof. When the escutcheon plate and electronic device are assembled to the housing, the arms extend along opposite side walls of the housing and may be locked thereto by a pair of rods engaging the holes in the arms. The rods selectively engage and disengage the holes by the operation of a key operated lock whose housing is affixed to a wall of the housing opposite the wall containing the access port. A plate is affixed to the housing outwardly of the wall to which the lock is secured and extends substantially parallel thereto, thereby limiting access to the keyway opening of the lock. A key, when inserted into the lock keyway, has a bar attached to the key which extends intermediate the plate and the wall carrying the lock. Manual pivotal operation of the bar permits the lock apparatus to be controlled by the key when the key is inserted into the lock.

A plurality of ventilating holes are disposed passing through the walls of the housing. The rods are supported, adjacent the free ends thereof, by passing through openings in a pair of L-shaped plates. One end of each L-shaped plate is fastened to the interior surface of the wall carrying the lock. The other leg of the L-shaped plate may be utilized to rest against the rearmost outermost surface of the electronic device preventing the electronic device from further travel inwardly into the housing. Holes are provided in the outer plate and in the wall of the housing carrying the lock which may be utilized to permit electrical cables to pass into the housing for connection to the electronic device.

Figure 1:
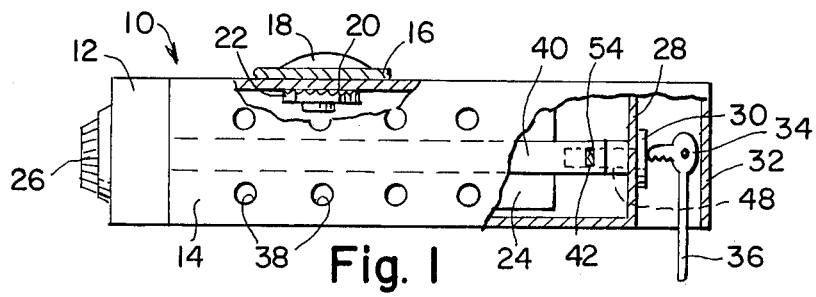
FIG. 1 is a side elevation view of the present invention.

Now referring to the figures and more particularly to the embodiment illustrated in FIG. 1 showing the present invention 10 comprising an escutcheon 12 and a housing 14 shown attached to a portion of the motor vehicle 16 such as a bottom most horizontal lip of the dashboard of an automobile, utilizing carridge bolts 18, lock washer 20 and nut 22 therefor. Electronic apparatus 24 is shown contained within housing 14 having an operative control knob 26 protruding through an opening in the escutcheon. Wall 28 of the housing carries key operated lock 30. Plate 32 is secured to housing 14 and conceals the key slot opening of lock 30, not shown. Key 34 is provided with bar 36 extending substantially at right angles to the length of key 34, facilitating the manual pivotal operation of key 34 when inserted into lock 30. A plurality of ventilating holes 38 facilitate the passage of air through housing 14 so as to provide ventilation for electronic device 24. Arm 40 is shown contained within housing 14 and is provided with hole 42 therein.

Figure 2:
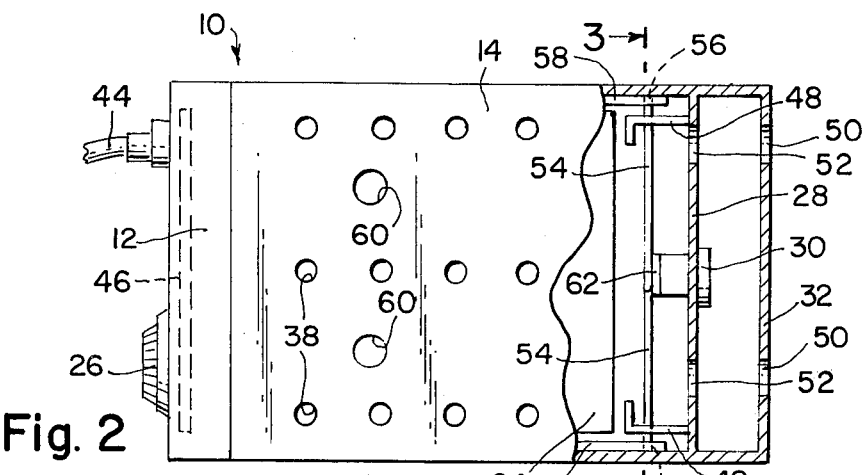
FIG. 2 is a plan view of the present invention.

FIG. 2 shows escutcheon 12 having knob 26 and cable 44 passing through the plate and extending through an opening therein. Dotted lines 46 describe the location of the face plate of electronic device 24 captured within housing 14 by a lip, not shown, of escutcheon plate 12 and a pair of L-shaped plates 48. Plates 48 are shown secured to rear wall 28, carrying lock 30. Plate 32 is provided with holes 50. Wall 28 is provided with holes 52, co-axially aligned with holes 50 such that electrical cables, not shown, may pass into the interior of housing 14. Rods 54 are controlled by lock 30 and pass through opening 42 in arm 40 and opening 56 in arm 58 so as to engage arms 40 and 58 in a locked position. Holes 60 are utilized to mount housing 14 to vehicular portion 16, as shown in FIG. 1.

Figure 3:
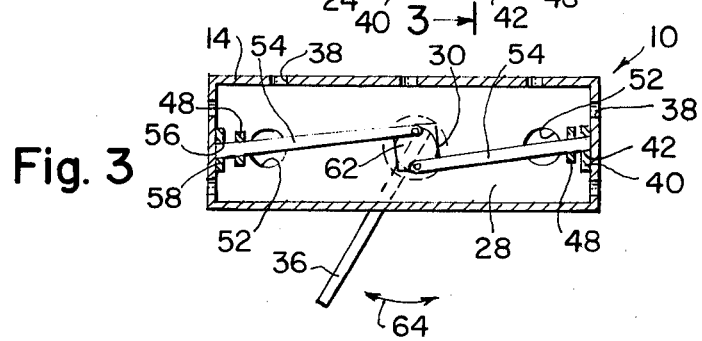
FIG. 3 is a side elevation cross-sectional view taken through line 3—3 viewed in the direction of arrow 3—3 as shown in FIG. 2.

FIG. 3 illustrates housing 14 having lock 30 secured to wall 28. Rods 54 are shown pivotably secured to rotatable plate 62, controlled by the operation of lock 30, such that the free ends of rods 54 may be removably engaged within openings 42 and 56 of arms 40 and 58 when bar 36 is operated in the direction of arrows 64.

Figure 4:
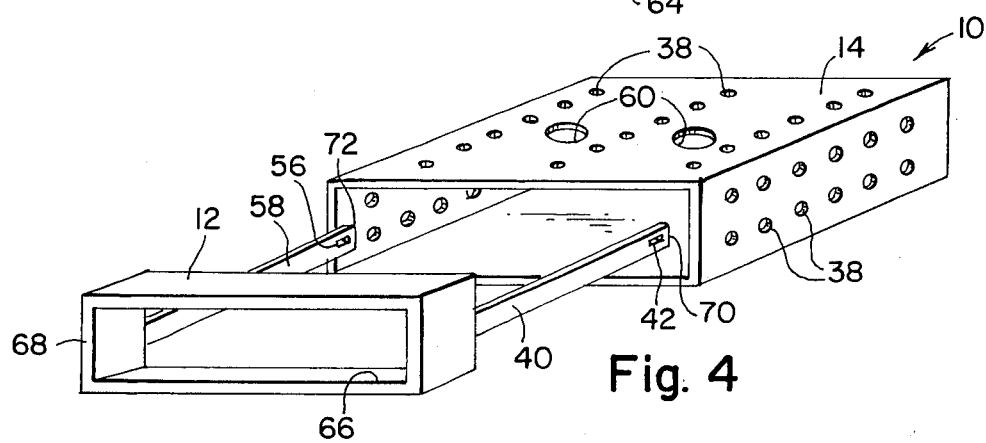
FIG. 4 is a perspective view of the present invention.

FIG. 4 shows the opening 66 in escutcheon 12. The escutcheon is provided with lip 68 utilized to clamp face plate 46, shown in FIG. 2, of electronic device 24. Arms 40 and 58 are shown secured to escutcheon 12 such that the free ends 70 and 72 thereof may slide within the interior of housing 14. When in the position shown, the electronic device 24, shown in FIGS. 1 and 2, may be withdrawn from housing 14 for servicing purposes.

One of the advantages of the present invention is a locking arrangement for vehicular communication equipment in which access to lock keyway is severely restricted.

Another advantage of the present invention is a communication equipment housing which substantially entirely encloses the equipment, thereby preventing unauthorized tampering with the internal mechanism thereof.

Still another advantage of the present invention is to provide a communication mounting and anti-theft apparatus which has a neat and finished appearance and which conceals from view the operative locking mechanism and vehicular mounting portions thereof.

Yet another advantage of the present invention is a communication mounting and anti-theft apparatus in accordance with the preceding advantages which is simple in constrcution, relatively inexpensive and effective for its particular purposes.

Thus there is disclosed in the above description and in the drawings, an embodiment of the invention which fully and effectively accomplishes the objects thereof. However, it will become apparent to those skilled in the art, how to make variations and modifications to the instant invention. Therefore this invention is to be limited, not by the specific disclosure herein, but only by the appending claims.

I claim:

1. An anti-theft housing for vehicular communication equipment comprising a housing, an escutcheon, said escutcheon having an opening therein, said opening being smaller in size than the front plate of a communication apparatus, a pair of arms extending outwardly from said opening and parallel to each other, said housing having an access port passing through a wall thereof, said communication apparatus being disposed partially passing through said port and partially residing within said housing when said escutcheon clampingly engages said front plate intermediate said escutcheon and said housing, said pair of arms being disposed within said housing when said escutcheon clampingly engages said front plate intermediate said escutcheon and said housing, a lock, said lock having a lock housing, said lock housing fixedly secured to a wall of said housing opposite to said wall having said port therein, a pair of rods extending outwardly from said lock, one end of each of said pair of rods operably positioned by locking and unlocking said lock into and out of engagement with openings located in the ends of said pair of arms when said pair of arms are disposed within said housing, a plate fixedly secured to said housing, said plate located parallel to the keyway opening of said lock and outwardly of said housing, a key, said key operably controlling said lock, said key having a bar fixedly secured thereto, said bar extending substantially at right angles to the length of said key, means to fixedly secure said housing to a motor vehicle.

2. The anti-theft housing for vehicular communication equipment as claimed in claim 1 wherein said plate has a plurality of openings, said wall to which said housing is fixedly secured having a plurality of openings.

3. The anti-theft housing for vehicular communication equipment as claimed in claim 1 wherein said housing and said escutcheon and said pair of arms and said pair of rods are fabricated from steel.

4. The anti-theft housing for vehicular communication equipment as claimed in claim 1 wherein said housing has a plurality of venting holes passing through the walls thereof.

* * * * *